US010305387B2

(12) United States Patent
El-Barbari et al.

(10) Patent No.: US 10,305,387 B2
(45) Date of Patent: May 28, 2019

(54) SYSTEMS AND METHODS FOR SINGLE ACTIVE BRIDGE CONVERTERS

(71) Applicant: ABB Schweiz AG, Baden (CH)

(72) Inventors: Said Farouk Said El-Barbari, Bavaria (DE); Simon Herbert Schramm, Bavaria (DE)

(73) Assignee: ABB Schweiz AG, Baden (CH)

( * ) Notice: Subject to any disclaimer, the term of this patent is extended or adjusted under 35 U.S.C. 154(b) by 130 days.

(21) Appl. No.: 14/447,189

(22) Filed: Jul. 30, 2014

(65) Prior Publication Data
US 2016/0036338 A1 Feb. 4, 2016

(51) Int. Cl.
*H02M 3/335* (2006.01)

(52) U.S. Cl.
CPC .............. *H02M 3/33576* (2013.01)

(58) Field of Classification Search
CPC .............. H02M 3/337; H02M 3/3376; H02M 3/33592; Y02B 70/1433; Y02B 70/1475
See application file for complete search history.

(56) References Cited

U.S. PATENT DOCUMENTS

| 4,541,288 | A | 9/1985 | Kornrumpf et al. |
| 5,710,698 | A | 1/1998 | Lai et al. |
| 5,892,666 | A | 4/1999 | Gucyski |
| 5,982,666 | A | 4/1999 | Gucyski |
| 6,320,775 | B1 | 11/2001 | Ito et al. |
| 6,927,987 | B2 | 8/2005 | Farrington et al. |
| 7,064,732 | B2 | 6/2006 | Van Der Broeck et al. |
| 7,365,451 | B2 | 4/2008 | Aritsuka |
| 7,782,639 | B2 | 8/2010 | Vinciarelli |
| 7,863,770 | B2 | 1/2011 | Lanni |
| 2003/0198064 | A1 | 10/2003 | Zhu et al. |
| 2006/0002156 | A1* | 1/2006 | Chen ............. H02M 3/28 363/24 |
| 2009/0129123 | A1 | 5/2009 | Taurand et al. |
| 2010/0008105 | A1* | 1/2010 | Mallwitz ........ H02M 3/33523 363/16 |
| 2010/0008107 | A1* | 1/2010 | Mallwitz ........ H02M 3/33576 363/21.02 |
| 2012/0300502 | A1* | 11/2012 | Shimada ......... H02M 1/4258 363/17 |

FOREIGN PATENT DOCUMENTS

| WO | 8501401 A1 | 3/1985 |
| WO | 2009135284 A1 | 11/2009 |
| WO | 2012175142 A1 | 12/2012 |

OTHER PUBLICATIONS

European Search Report and Written Opinion issued in connection with corresponding EP Application No. 15176634.2 dated Oct. 23, 2015.
Kerekes, T. et al., "A New High-Efficiency Single-Phase Transformerless PV Inverter Topology", IEEE, Jan. 2011, pp. 184-191, vol. 58, Issue: 1.

* cited by examiner

*Primary Examiner* — Nguyen Tran
*Assistant Examiner* — Monica Mata
(74) *Attorney, Agent, or Firm* — Barnes & Thornburg LLP

(57) ABSTRACT

A single active bridge converter is provided. The single active bridge converter includes a transformer including a primary winding and a secondary winding, a primary side circuit electrically coupled to the primary winding and including an H bridge circuit, and a secondary side circuit electrically coupled to the secondary winding, the secondary side circuit including a switch configured to selectively short the transformer secondary winding.

10 Claims, 10 Drawing Sheets

SYSTEMS AND METHODS FOR SINGLE ACTIVE BRIDGE CONVERTERS

BACKGROUND

The field of the invention relates generally to power converters, and more particularly, to single active bridge power converters.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

At least some power systems include power converters such as alternating current (AC) to direct current (DC) converters, DC to DC converters, DC to AC converters, and AC to AC converters. FIG. 1 is a circuit diagram of a known DC to DC power conversion system 10 that includes a single active bridge converter 11 (i.e., a converter including an H bridge on only one side). Specifically, converter 11 includes a primary side 12 coupled to a secondary side 14 through a transformer 16. Primary side 12 includes an H bridge 20, but secondary side 14 does not include any active components. Accordingly, converter 11 is not bi-directional.

Further, to ensure proper operation of converter 11, transformer 16 is relatively large, resulting in converter 11 having a relatively high cost and a relatively large footprint. Specifically, transformer turn ratios are designed to operate in a buck operation, and do not reflect a voltage ratio between a primary and a secondary side. Accordingly, a comparably large reactive power is absorbed by the transformer, preventing an optimal active/apparent power ratio and requiring a relatively large transformer.

BRIEF DESCRIPTION

In one aspect, a single active bridge converter is provided. The single active bridge converter includes a transformer including a primary winding and a secondary winding, a primary side circuit electrically coupled to the primary winding and including an H bridge circuit, and a secondary side circuit electrically coupled to the secondary winding, the secondary side circuit including a switch configured to selectively short the transformer secondary winding.

In another aspect, a power conversion system is provided. The power conversion system includes a power supply, a load, and a single active bridge converter coupled between the power supply and the load. The single active bridge converter includes a transformer including a primary winding and a secondary winding, a primary side circuit electrically coupled to the primary winding and including an H bridge circuit, and a secondary side circuit electrically coupled to the secondary winding, the secondary side circuit including a switch configured to selectively short the transformer secondary winding.

In yet another aspect, a method for operating a power conversion system is provided. The method includes electrically coupling a single active bridge converter between a power supply and a load, the single active bridge converter including a transformer having a primary winding and a secondary winding, a primary side circuit electrically coupled to the primary winding and having an H bridge circuit, and a secondary side circuit electrically coupled to the secondary winding, and operating a switch to selectively short the transformer secondary winding.

DETAILED DESCRIPTION

Exemplary embodiments of a single active bridge converter are provided. The single active bridge converter includes a primary side circuit and a secondary side circuit electrically coupled to each other using a transformer. The secondary side circuit includes a switch that is configured to selectively short the transformer secondary winding, providing performance improvements over at least some known single active bridge converters.

Figure 2:
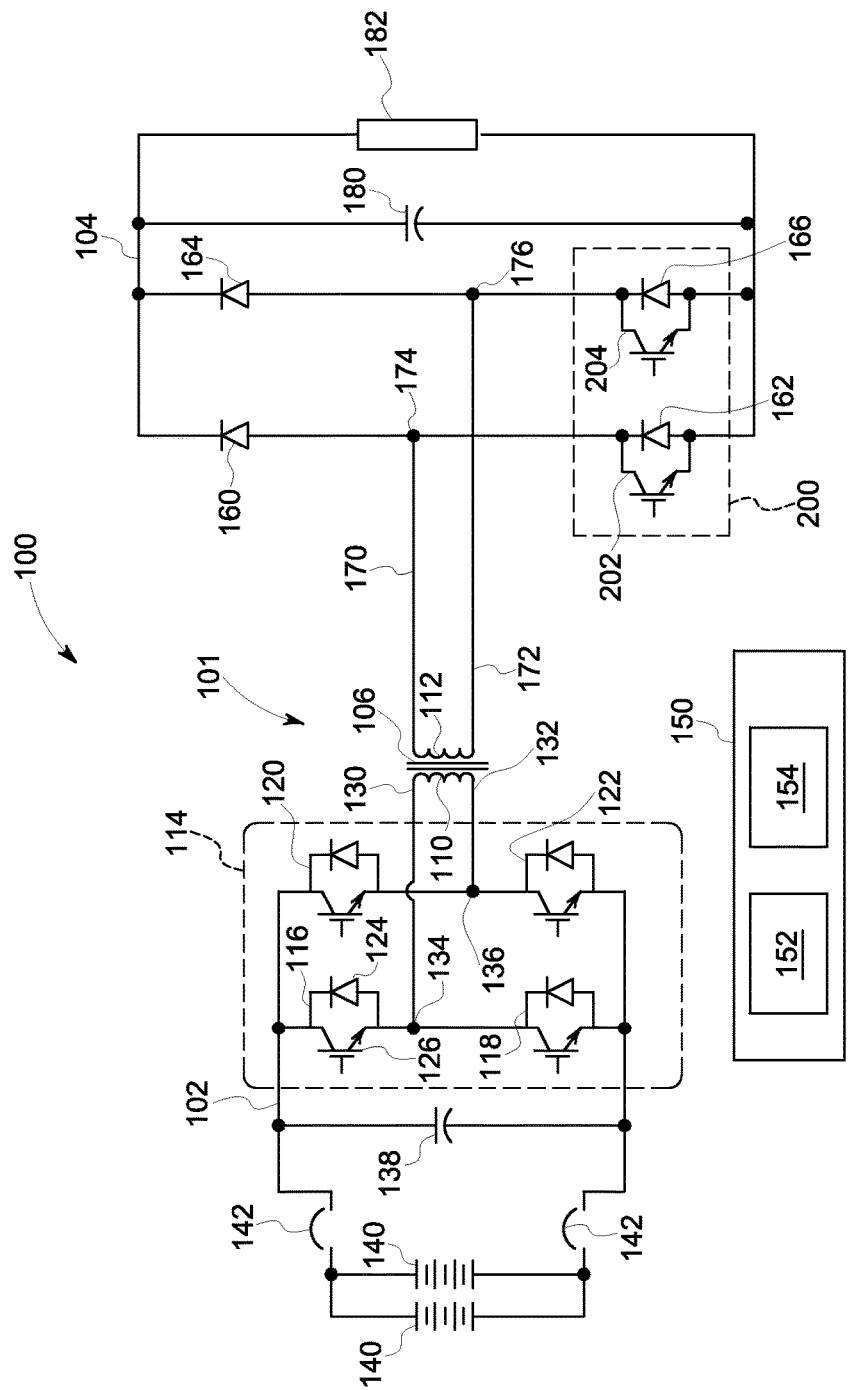
FIG. 2 is a circuit diagram of an exemplary power conversion system.

FIG. 2 is a circuit diagram of an exemplary power conversion system 100 including a single active bridge (SAB) converter 101. As used herein, a "single active bridge converter" refers to a converter that includes an H bridge, or H bridge circuit, on only one side. That is, one side of a single active bridge converter does not include an H bridge. Further, the term "active" in "single active bridge converter" merely refers to the use of active (as opposed to passive) components in the converter, and does not suggest or require that the converter actually be currently functioning in an operative state. Moreover, the term "H bridge", or "H bridge circuit", refers to a circuit that includes four switches (e.g., solid-state or mechanical). Specifically, the four switches are arranged such that a first switch and a second switch are electrically coupled in series, a third switch and a fourth switch are electrically coupled in series, and an electrical connection extends between a first node located between the first and second switches and a second node located between the third and fourth switches.

In the exemplary embodiment, converter 101 includes a primary side 102 and a secondary side 104 (also referred to herein as a primary side circuit and a secondary side circuit). A transformer 106 is coupled between primary and secondary sides 102 and 104. In the exemplary embodiment, converter 101 is a direct current (DC) to DC converter. Alternatively, converter 101 may be any type of converter than functions as described herein. The differences between voltages on primary side 102 and voltages on secondary side 104 applied to a leakage inductance of transformer 106 drive currents and determine an output power of converter 101.

Transformer 106 includes a primary winding 110 coupled to primary side 102 and a secondary winding 112 coupled to secondary side 104. Primary side 102 includes an H bridge 114 formed by a first switch 116, a second switch 118, a third switch 120, and a fourth switch 122. In the exemplary embodiment, each switch 116, 118, 120, and 122 includes a diode 124 electrically coupled between a collector and an emitter of an insulated gate bipolar transistor (IGBT) 126. Alternatively, each switch 116, 118, 120 and 122 may be any switching device that enables converter 101 to function as described herein.

In the exemplary embodiment, primary winding 110 includes a first end 130 and a second end 132. First end 130 is electrically coupled to a first node 134 between first and second switches 116 and 118, and second end 132 is electrically coupled to a second node 136 between third and fourth switches 120 and 122. Primary side 102 further includes a first capacitor 138 electrically coupled in parallel with the series connection of first and second switches 116 and 118 and the series connection of third and fourth switches 120 and 122.

As shown in FIG. 2, system 100 includes a plurality of batteries 140 (i.e., a power supply) coupled to primary side 102. Batteries 140 provide a DC voltage to primary side 102. A pair of circuit breakers 142 are electrically coupled between batteries 140 and H bridge 114. Circuit breakers enable batteries 140 to be electrically disconnected from H bridge 114 in response to, for example, detection of a fault.

By selectively opening and/or closing switches 116, 118, 120, and 122, a voltage across primary winding 110 and a current through primary winding 110 can be controlled. In the exemplary embodiment, the state (i.e., open or closed) of each switch 116, 118, 120, and 122 is controlled by a controller 150 that is communicatively coupled to switches 116, 118, 120, and 122.

In the exemplary embodiment, controller 150 is implemented by a processor 152 communicatively coupled to a memory device 154 for executing instructions. In some embodiments, executable instructions are stored in memory device 154. Alternatively, controller 150 may be implemented using any circuitry that enables controller 150 to control operation of converter 101.

In the exemplary embodiment, controller 150 performs one or more operations described herein by programming processor 152. For example, processor 152 may be programmed by encoding an operation as one or more executable instructions and by providing the executable instructions in memory device 154. Processor 152 may include one or more processing units (e.g., in a multi-core configuration). Further, processor 152 may be implemented using one or more heterogeneous processor systems in which a main processor is present with secondary processors on a single chip. As another illustrative example, processor 152 may be a symmetric multi-processor system containing multiple processors of the same type. Further, processor 152 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 154 is one or more devices that enable information such as executable instructions and/or other data to be stored and retrieved. Memory device 154 may include one or more computer readable media, such as, without limitation, dynamic random access memory (DRAM), static random access memory (SRAM), a solid state disk, and/or a hard disk. Memory device 154 may be configured to store, without limitation, application source code, application object code, source code portions of interest, object code portions of interest, configuration data, execution events and/or any other type of data.

Secondary side 104 includes a first diode 160, a second diode 162, a third diode 164, and a fourth diode 166 in the exemplary embodiment. First and second diodes 160 and 162 are biased in the same direction, and third and fourth diodes 164 and 166 are biased in the same direction. Similar to primary winding 110, secondary winding 112 of transformer 106 includes a first end 170 and a second end 172. First end 170 is electrically coupled to a third node 174 between first and second diodes 160 and 162, and second end 172 is electrically coupled to a fourth node 176 between third and fourth diodes 164 and 166. Secondary side 104 further includes a second capacitor 180 electrically coupled in parallel with third and fourth diodes 164 and 166. Further, a load 182 is coupled to secondary side 104. Specifically, load 182 is electrically coupled in parallel with second capacitor 180.

As shown in FIG. 2, in the exemplary embodiment, secondary side 104 includes a switch 200. Switch 200 facilitates operating secondary side 104 in a zero vector state (i.e., a state where a DC voltage is substantially zero on secondary side 104), as described in detail herein.

As shown in FIG. 2, switch 200 includes a first switching device 202 electrically coupled in parallel with second diode 162 and a second switching device 204 electrically coupled in parallel with fourth diode 166. In the exemplary embodiment, first and second switching devices 202 and 204 are IGBTs. Alternatively, first and second switching devices 202 and 204 may be any switching component that enables system 100 to function as described herein.

In the exemplary embodiment, controller 150 is communicatively coupled to first and second switching devices 202 and 204. Accordingly, controller 150 controls whether each of first and second switching devices 202 and 204 is in an open state or a closed state.

When one of first and second switching devices 202 and 204 are closed, an associated one of second and fourth diodes 162 and 166 is bypassed, with current paths created through the closed one of first and second switching devices 202 and 204. For example, with first switching device 202 closed, current flows in a first direction from the collector to the emitter of first switching device 202 and through fourth diode 166. On the other hand, with second switching device 204 closed, current flows in a second, opposite direction from the collector to the emitter of second switching device 202, and through first diode 162. Accordingly, current can be selectively flowed in either direction. This functionality is referred to as a zero vector. Further, closing first and second switching devices 202 and 204 shorts secondary winding 112, as first and second ends 170 and 172 are tied directly to each other. With first and second ends 170 and 172 tied to each other, voltage applied across secondary winding 112 is substantially zero.

In the exemplary embodiment, first and second switching devices 202 and 204 are electrically coupled in parallel with second and fourth diodes 162 and 166, respectively. Alternatively, to achieve equivalent functionality, first and second switching devices 202 and 204 may be electrically coupled in parallel with first and third diodes 160 and 164, respectively.

Figure 3:
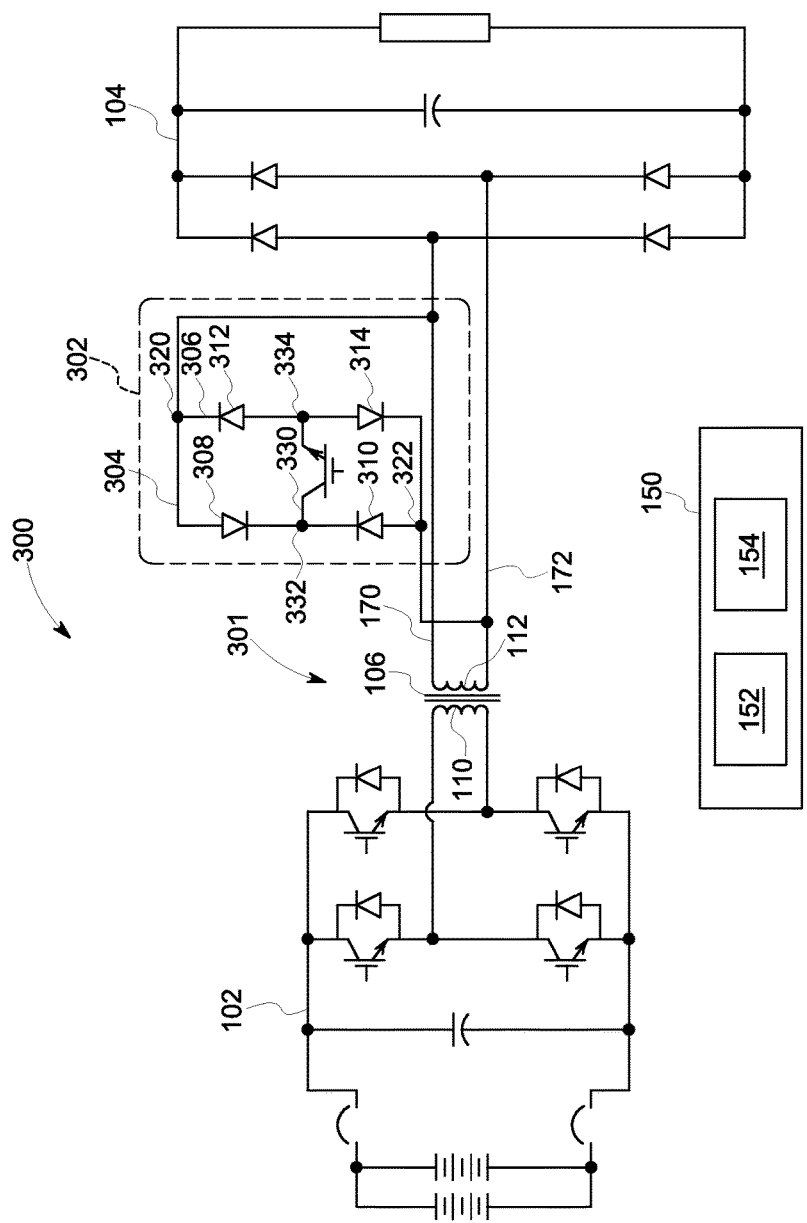
FIG. 3 is a circuit diagram of an alternative exemplary power conversion system.

FIG. 3 is a circuit diagram of an alternative exemplary power conversion system 300 including a single active bridge (SAB) converter 301. Unless otherwise indicated, system 300 and converter 301 include the same components as and are substantially similar to system 100 and converter 101 (both shown in FIG. 2).

As shown in FIG. 3, secondary side 104 includes an switch 302 that includes a first current path 304 in parallel with a second current path 306. First current path 304 includes a first diode 308 in series with a second diode 310, and second current path 306 includes a third diode 312 in series with a fourth diode 314. First and second diodes 308 and 310 are biased in opposite directions, and third and fourth diodes 312 and 314 are biased in opposite directions.

A first node 320 of switch 302 is electrically coupled to first end 170 of secondary winding 112. First node 320 is positioned between first diode 308 and third diode 312. A second node 322 of switch 302 is electrically coupled to second end 172 of secondary winding 112. Second node 322 is positioned between second diode 310 and fourth diode 314.

A switching device 330 is coupled between a third node 332 and a fourth node 334. Third node 332 is positioned between first and second diodes 308 and 310, and fourth node 334 is positioned between third and fourth diodes 312 and 314. In the exemplary embodiment, switching device 330 is an IGBT with a collector coupled to third node 332 and an emitter coupled to fourth node 334. Alternatively, switching device 330 may be any switching device that enables system 300 to function as described herein.

In the exemplary embodiment, controller 150 is communicatively coupled to switching device 330. Accordingly, controller 150 controls whether switching device 330 is in an open state or a closed state.

When switching device 330 is closed, a current path is created from first end 170, through first diode 308, through switching device 330, through fourth diode 314, and to second end 172. Accordingly, closing switching device 330 shorts secondary winding 112, as first and second ends 170 and 172 are tied directly to each other. With first and second ends 170 and 172 tied to each other, the voltage applied across secondary winding 112 is substantially zero.

Figure 4:
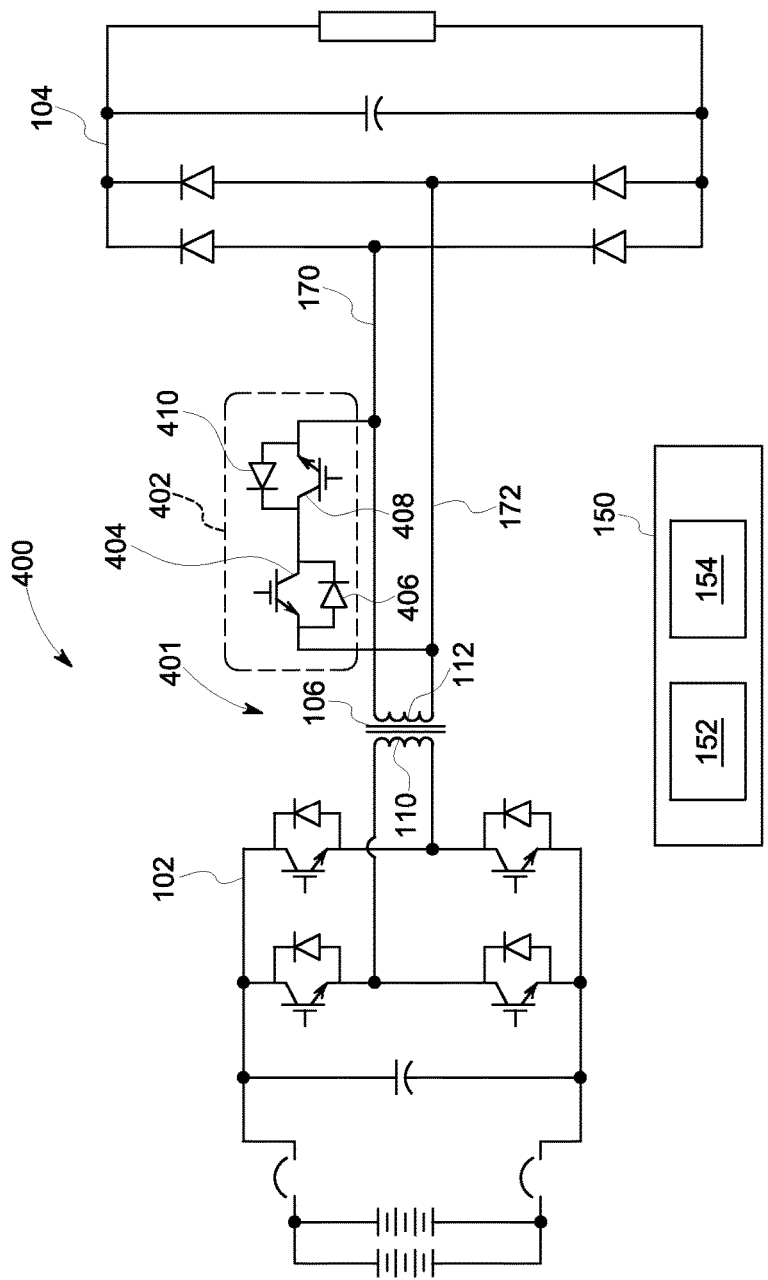
FIG. 4 is a circuit diagram of an alternative exemplary power conversion system.

FIG. 4 is a circuit diagram of an alternative exemplary power conversion system 400 including a single active bridge (SAB) converter 401. Unless otherwise indicated, system 400 and converter 401 include the same components as and are substantially similar to system 100 and converter 101 (both shown in FIG. 2).

As shown in FIG. 4, secondary side 104 includes a switch 402 electrically coupled between first end 170 and second end 172. Switch 402 includes, in series, a first switching device 404 in parallel with a first diode 406, and a second switching device 408 in parallel with a second diode 410. First and second diodes 406 and 410 are biased in opposite directions.

In the exemplary embodiment, first and second switching devices 404 and 408 are each IGBTs with an associated diode 406 and 410 coupled between the collector and emitter of the transistor. Alternatively, first and second switching devices 404 and 408 may be any switching device that enables system 400 to function as described herein.

Controller 150 is communicatively coupled to first and second switching devices 404 and 408. Accordingly, controller 150 controls whether first and second switching devices 404 and 408 are in an open state or a closed state.

When one of first and second switching devices 404 and 408 are closed, a current path is created from first end 170 to second end 172 through one of first and second switching device 404 and 408, bypassing one of first and second diodes 406 and 410. For example, closing first switching device 404 causes current to flow in a first direction through second diode 410 and from a collector to an emitter of first switching device 404. On the other hand, closing second switching device 408 causes current to flow in a second, opposite direction through first diode 406 and from a collector to an emitter of second switching device 408. Accordingly, closing one of first and second switching devices 404 and 408 shorts secondary winding 112, as first and second ends 170 and 172 are tied directly to each other. With first and second ends 170 and 172 tied to each other, the voltage applied across secondary winding 112 is substantially zero.

As described above, using a switch, such as switch 200, 302, or 402, enables secondary side 104 to operate in a zero vector state, providing advantages over at least some known single active bridge converters. In the specific embodiments described herein, the switch is located on the secondary side of the converter. Alternatively, in some embodiments, the switch is located on the primary side of the converter, or across a tertiary winding (not shown) of transformer 106.

Figure 1:
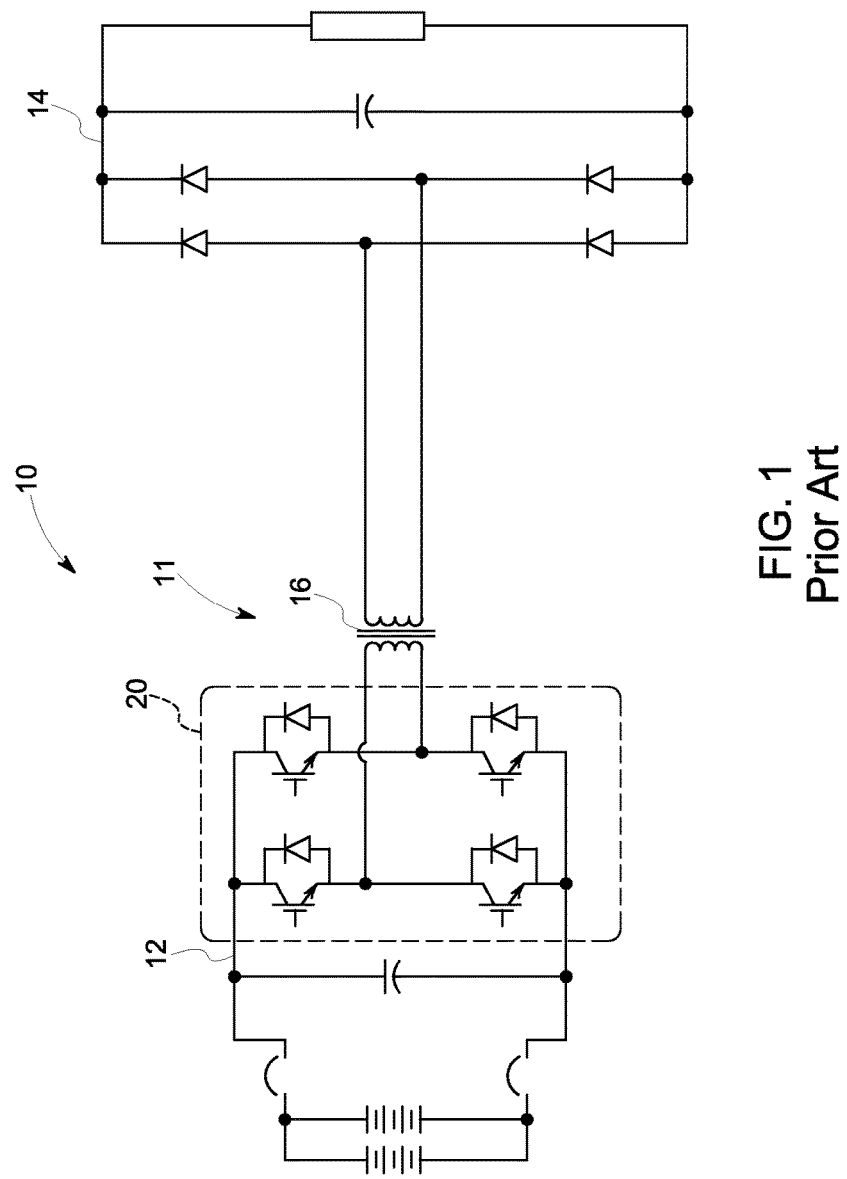
FIG. 1 is a circuit diagram of a known power conversion system.
Figure 5:
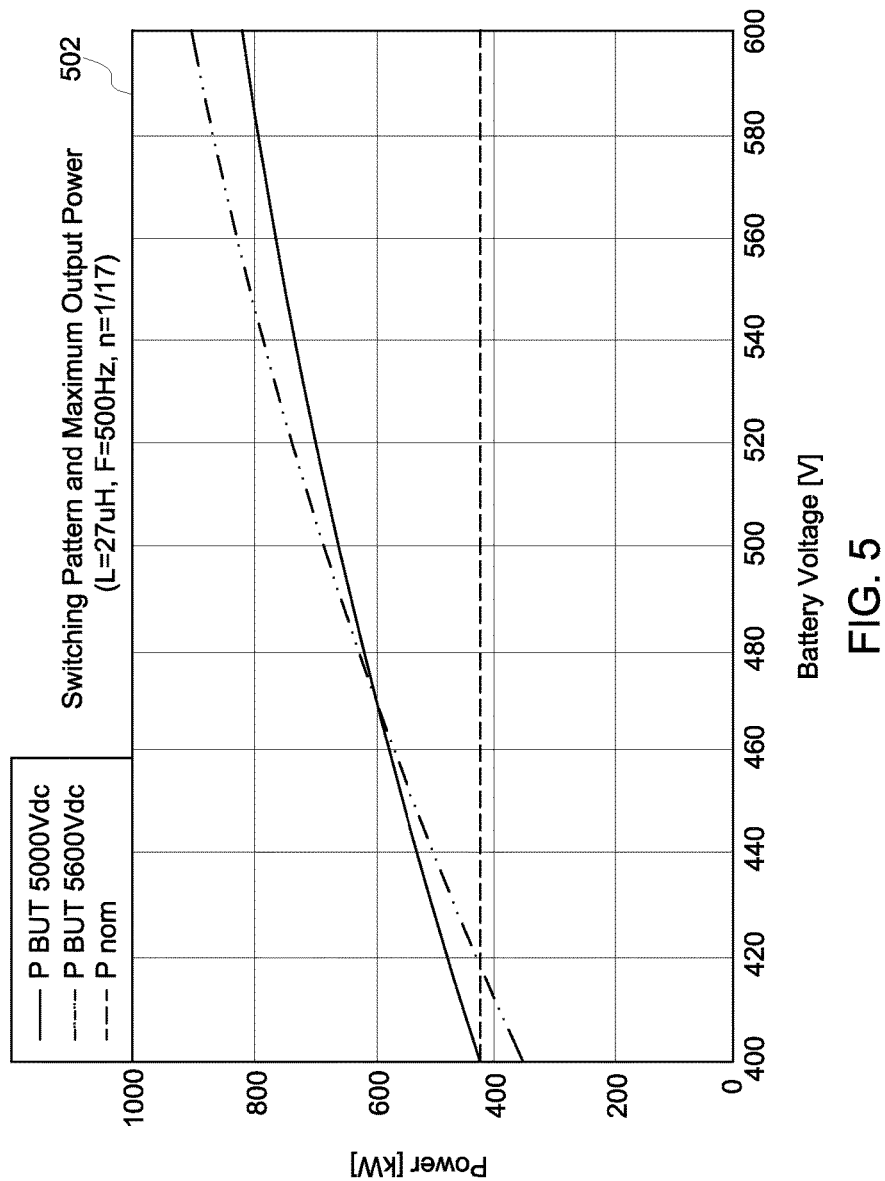
FIG. 5 is a graph plotting voltage versus power for a known single active bridge converter.
Figure 6:
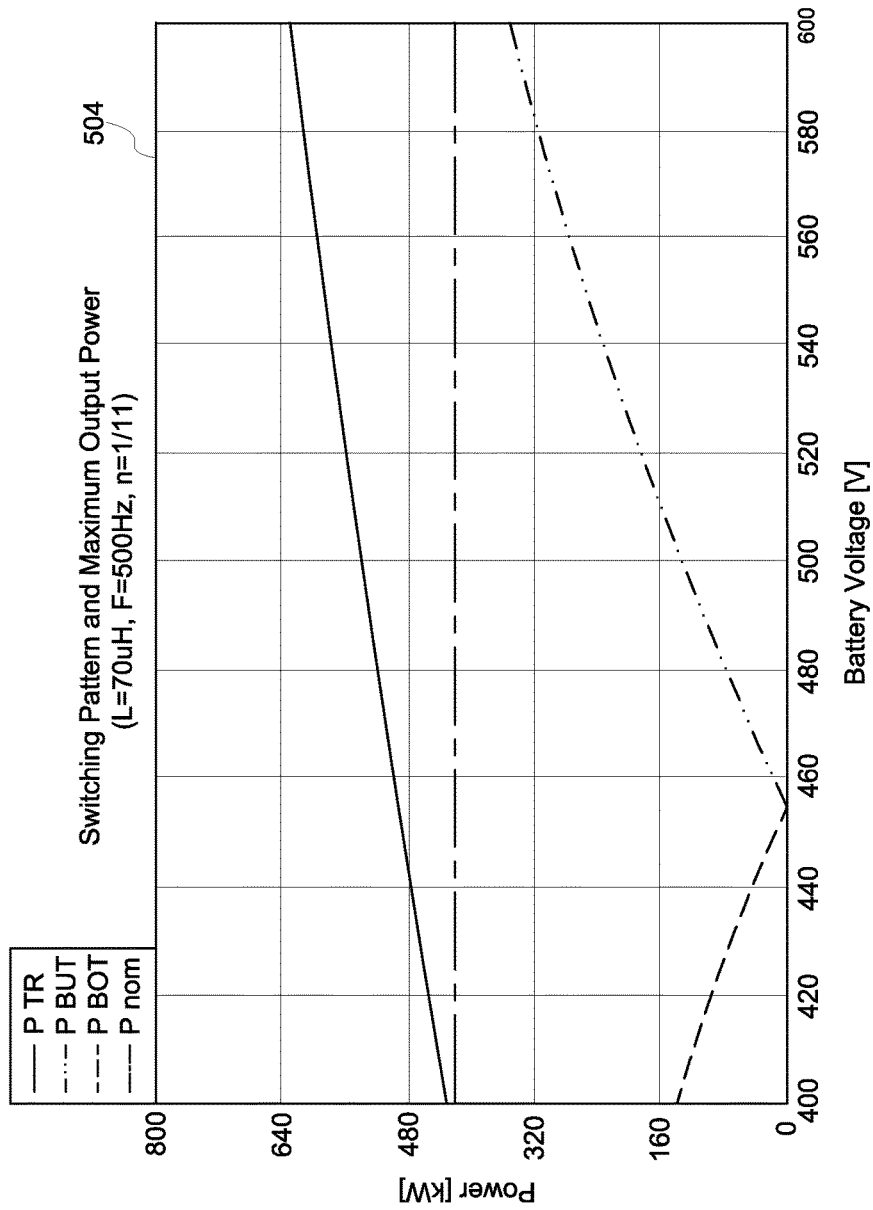
FIG. 6 is a graph plotting voltage versus power for an exemplary single active bridge converter.

FIG. 5 is a graph 502 plotting primary voltage versus transfer power capability for a known single active bridge converter, such as single active bridge converter 11 (shown in FIG. 1). In contrast, FIG. 6 is a graph 504 plotting primary voltage versus transfer power capability for an improved single active bridge converter, such as converter 101. As demonstrated by a comparison of FIGS. 5 and 6, converter 11 requires a substantially larger transformer design than converter 101 to achieve a similar power transfer capability as converter 101. For example, converter 11 has an inductance of L=27 µH and a turn ratio of n=1/17, while converter 101 has an inductance of L=70 µH and a turn ratio of n=1/11.

Moreover, converter 101 is capable of operating substantially similar to a dual active bridge converter (i.e., a converter including an H bridge on both sides). However, unlike a dual active bridge converter, converter 101 utilizes two active components (first and second switching devices 202 and 204) as opposed to the four active components in the secondary side H bridge of a dual active bridge converter.

Figure 7:
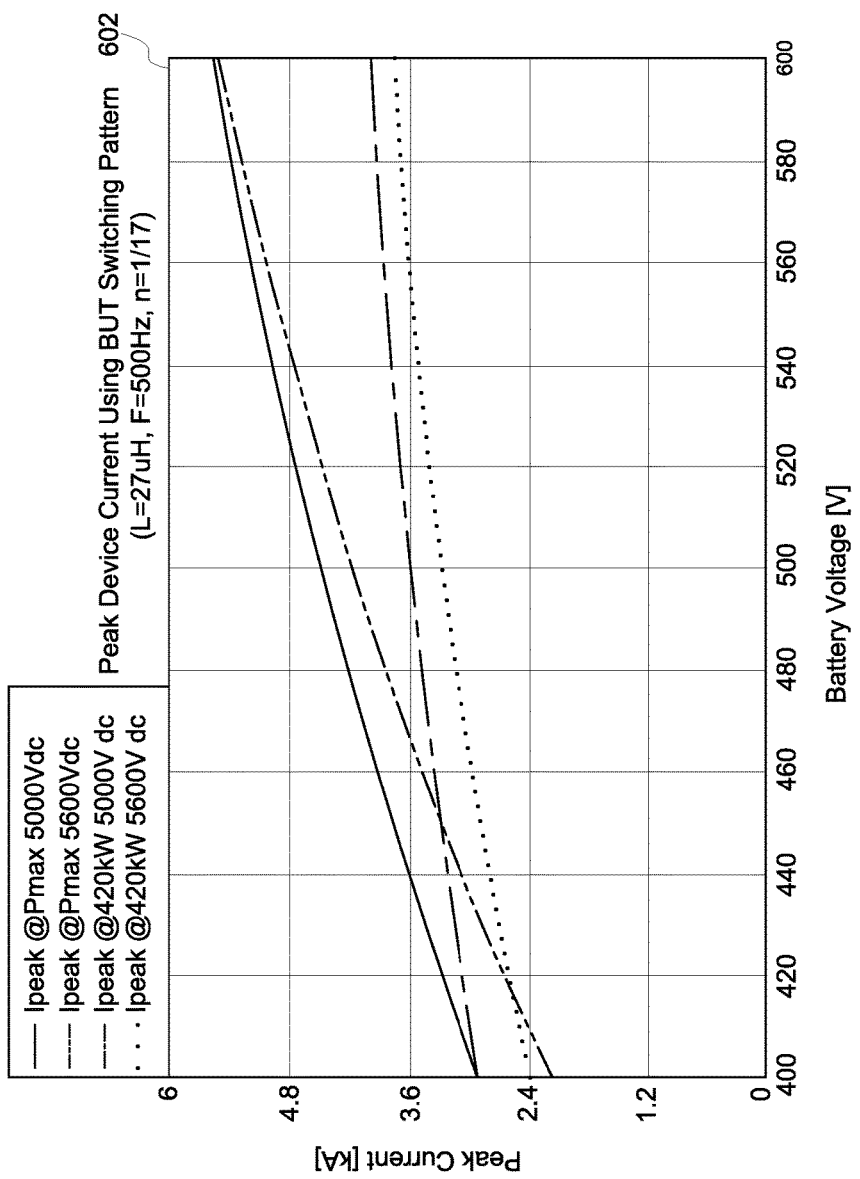
FIG. 7 is a graph plotting voltage versus peak current for a known single active bridge converter.
Figure 8:
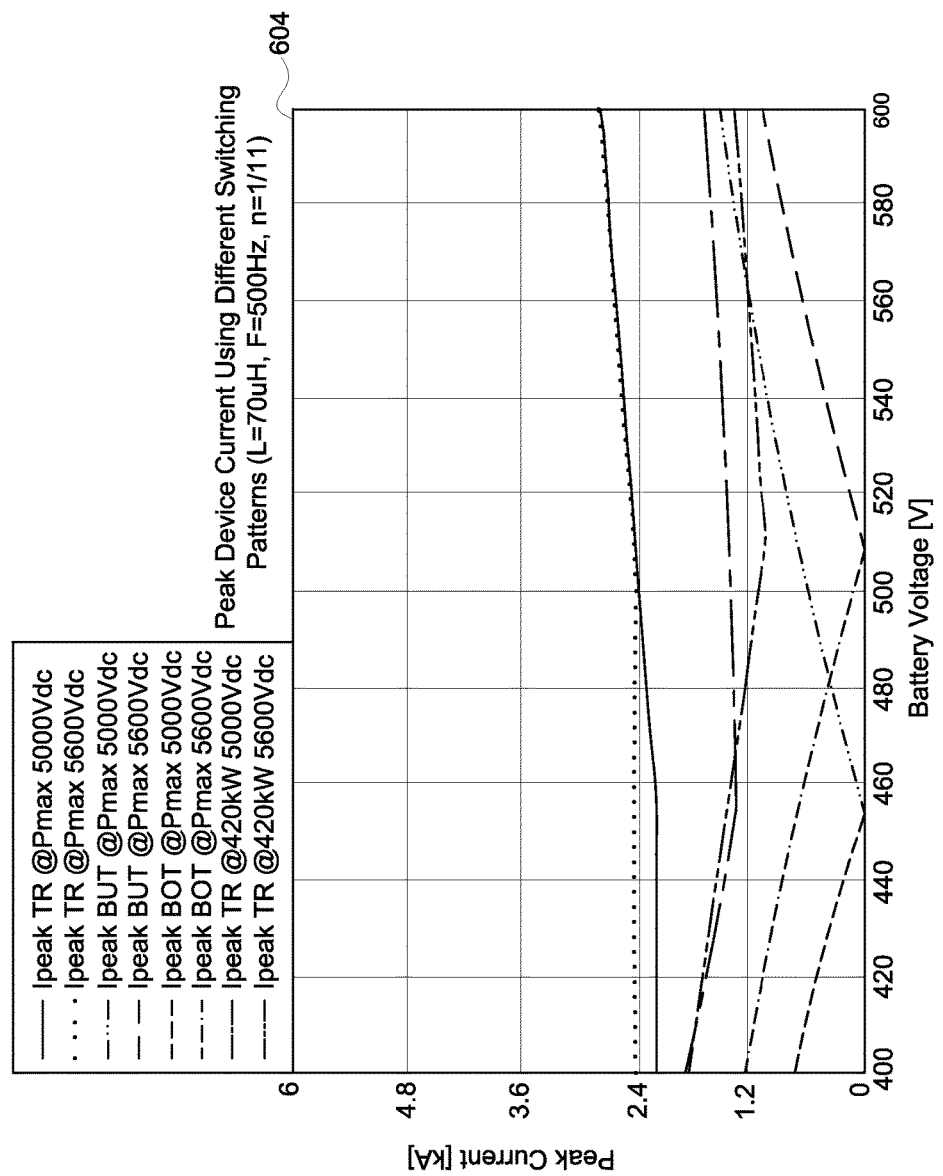
FIG. 8 is a graph plotting voltage versus peak current for an exemplary single active bridge converter.

FIG. 7 is a graph 602 plotting voltage versus peak current for a known single active bridge converter, such as single active bridge converter 11 (shown in FIG. 1). In contrast, FIG. 8 is a graph 604 plotting voltage versus peak current for an improved single active bridge converter, such as converter 101. Accordingly graph 602 is associated with graph 502, and graph 604 is associated with graph 504. As demonstrated by a comparison of FIGS. 7 and 8, converter 101 has a substantially lower peak current than converter 11 for the same active power transferred through the converter. A high peak current affects device selection, cooling, transformer rating, etc. Accordingly the lower peak current of converter 101 for the same active power transfer is advantageous over converter 11.

Figure 9:
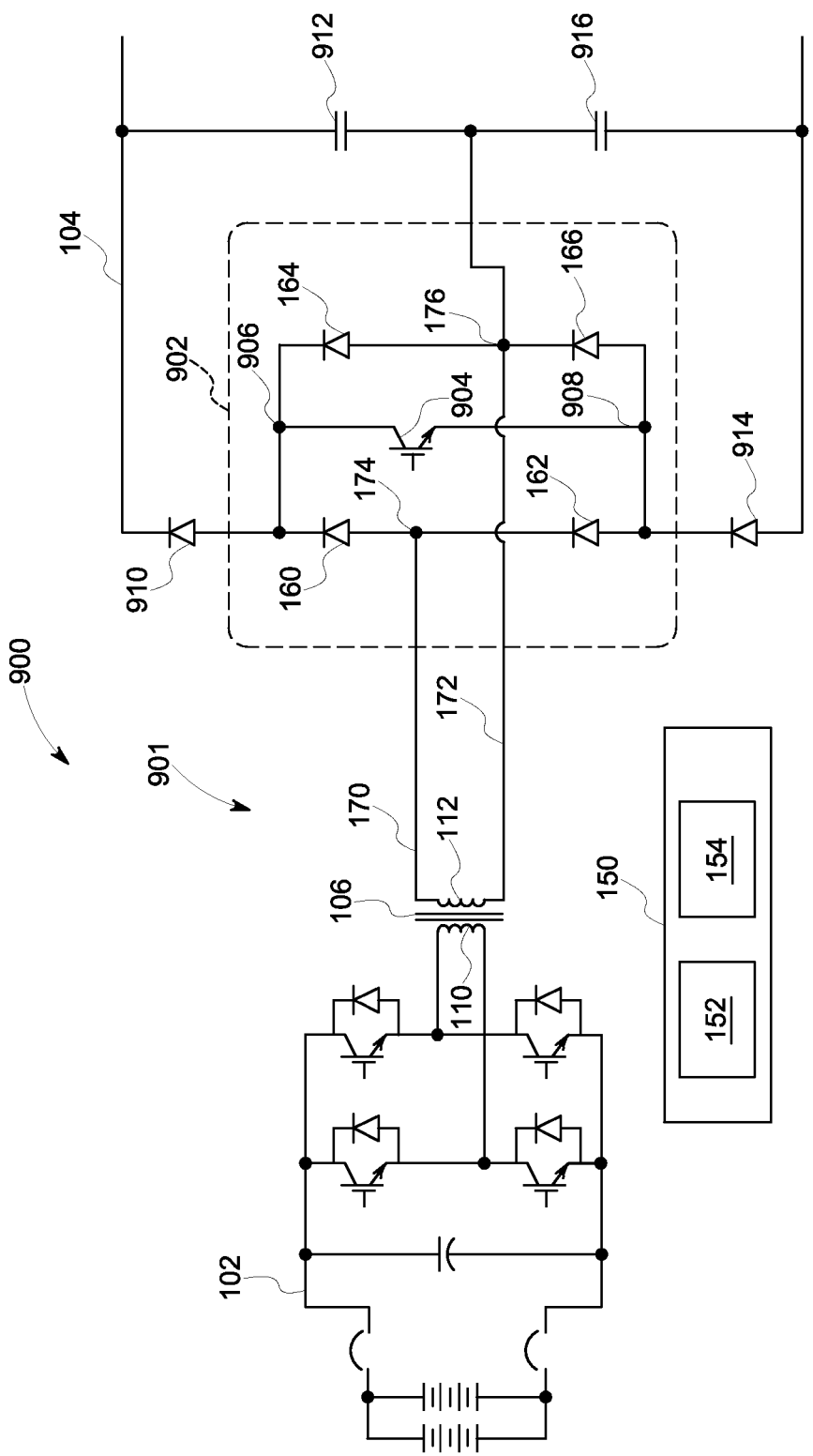
FIG. 9 is a circuit diagram of an alternative exemplary power conversion system.

FIG. 9 is a circuit diagram of an alternative exemplary power conversion system 900 including a single active bridge (SAB) converter 901. Unless otherwise indicated, system 900 and converter 901 include the same components as and are substantially similar to system 100 and converter 101 (both shown in FIG. 2). Notably, converter 101 utilizes less active and passive devices than converter 301 (shown in FIG. 3) and converter 401 (shown in FIG. 1).

As shown in FIG. 9, secondary side 104 includes a switch 902 that includes a switching device 904 coupled between first, second, third, and fourth diodes 160, 162, 164, and 166.

Specifically, switching device 904 is electrically coupled between a fifth node 906 (that is positioned between first and third diodes 160 and 164) and a sixth node 908 (that is positioned between second and fourth diodes 162 and 166). In the exemplary embodiment, switching device 904 is an IGBT with a collector coupled to fifth node 906 and an emitter coupled to sixth node 908. Alternatively, switching device 904 may be any switching device that enables system 300 to function as described herein.

Secondary side 104 further includes a fifth diode 910 and a first capacitor 912 electrically coupled in series between fifth node 906 and second end 172, as well as a sixth diode 914 and a second capacitor 916 electrically coupled in series between sixth node 908 and second end 172. In the exemplary embodiment, controller 150 is communicatively coupled to switching device 904. Accordingly, controller 150 controls whether switching device 904 is in an open state or a closed state.

When switching device 904 is closed, a current path is created from first end 170, through first diode 160, through switching device 904, through fourth diode 166, and to second end 172. Accordingly, closing switching device 330 shorts secondary winding 112, as first and second ends 170 and 172 are tied directly to each other. With first and second ends 170 and 172 tied to each other, the voltage applied across secondary winding 112 is substantially zero.

Figure 10:
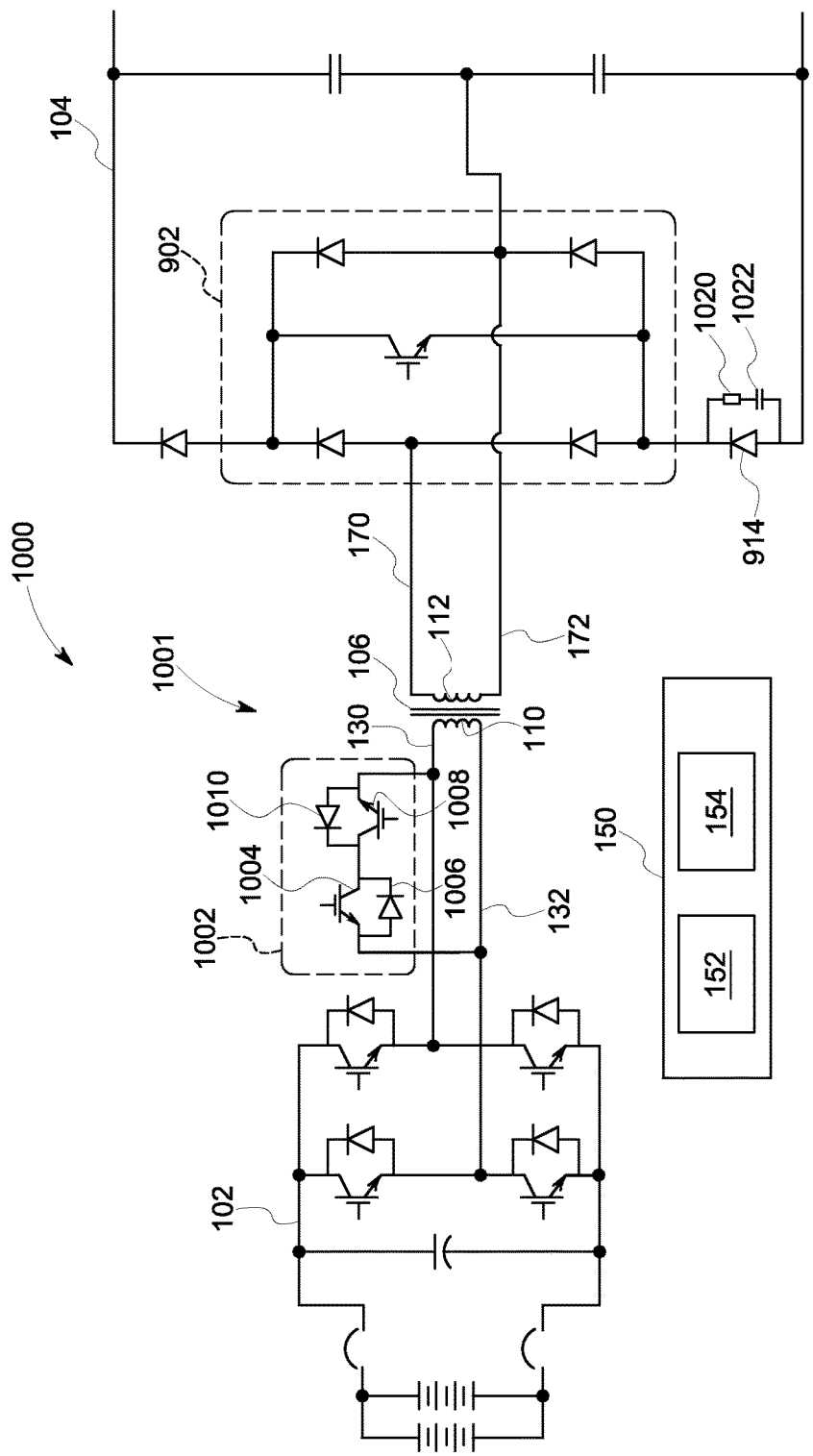
FIG. 10 is a circuit diagram of an alternative exemplary power conversion system.

FIG. 10 is a circuit diagram of an alternative exemplary power conversion system 1000 including a single active bridge (SAB) converter 1001. Unless otherwise indicated, system 1000 and converter 1001 include the same components as and are substantially similar to system 900 and converter 901 (both shown in FIG. 9).

As compared to converter 901, converter 1001 includes an additional AC switch 1002 on primary side 102. AC switch 1002 includes, in series, a first switching device 1004 in parallel with a first diode 1006, and a second switching device 1008 in parallel with a second diode 1010. First and second diodes 1006 and 1010 are biased in opposite directions. Converter 1001 further includes a resistor 1020 and capacitor 1022 coupled in parallel with sixth diode 914 in the exemplary embodiment.

In the exemplary embodiment, first and second switching devices 1004 and 1008 are each IGBTs with an associated diode 1006 and 1010 coupled between the collector and emitter of the transistor. Alternatively, first and second switching devices 1004 and 1008 may be any switching device that enables system 1000 to function as described herein.

Controller 150 is communicatively coupled to first and second switching devices 1004 and 1008. Accordingly, controller 150 controls whether first and second switching devices 1004 and 1008 are in an open state or a closed state.

When one of first and second switching devices 1004 and 1008 are closed, a current path is created from first end 130 to second end 132 through one of first and second switching device 1004 and 1008, bypassing one of first and second diodes 1006 and 1010. For example, closing first switching device 1004 causes current to flow in a first direction through second diode 1010 and from a collector to an emitter of first switching device 1004. On the other hand, closing second switching device 1008 causes current to flow in a second, opposite direction through first diode 1006 and from a collector to an emitter of second switching device 1008. Accordingly, closing one of first and second switching devices 1004 and 1008 shorts primary winding 110, as first and second ends 130 and 132 are tied directly to each other. With first and second ends 130 and 132 tied to each other, the voltage applied across primary winding 110 is substantially zero. This provides advantages for electromagnetic interference purposes.

As compared to at least some known single active bridge converters, the single active bridge converters described herein utilize smaller transformers, have lower peak currents, and have improved power capabilities. Further, the single active bridge converters described herein perform similar to dual active bridge converters while using less active components than dual active bridge converters. Moreover, the single active bridge converters described herein may be implemented in a variety of applications, including transportation industry applications, power distribution applications, subsea power applications, and renewable energy applications.

Exemplary embodiments of systems and methods for single active bridge converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A single active bridge converter comprising:
   a transformer comprising a primary winding and a secondary winding;
   a primary side circuit electrically coupled to said primary winding and comprising an H bridge circuit; and
   a secondary side circuit electrically coupled to said secondary winding, said secondary side circuit including:
   a switch coupled to said secondary winding, said switch configured to selectively short said secondary winding, said switch comprising:

first and second serially-coupled diodes, wherein a first side of said secondary winding is coupled to a first node defined between said first and second serially-coupled diodes;

third and fourth serially-coupled diodes, wherein a second side of said secondary winding is coupled to a second node defined between said third and fourth serially-coupled diodes; and a switching device electrically coupled between a third node defined between said first and third diodes and a fourth node defined between said second and fourth diodes, wherein when closed, said switching device is configured to cause voltage applied across said secondary winding to be zero; and a passive circuit coupled to an output of said secondary winding, said passive circuit comprising:

a fifth diode electrically coupled in series to a first capacitor, said series-coupled fifth diode and first capacitor directly connected at a first side to an output of said switch defined at said third node and at a second side to said second side of said secondary winding; and a sixth diode electrically coupled in series to a second capacitor, said series-coupled sixth diode and second capacitor directly connected at a first side to an output of said switch defined at said fourth node and at a second side to said second side of said secondary winding.

2. A single active bridge converter in accordance with claim 1, wherein said secondary winding comprises a first end and a second end, and wherein said switch is electrically coupled between said first and second ends.

3. A single active bridge converter in accordance with claim 1, wherein said switching device is an IGBT.

4. A single active bridge converter in accordance with claim 1, wherein said single active bridge converter comprises a direct current (DC) to DC converter.

5. A power conversion system comprising:
a power supply;
a load; and
a single active bridge converter coupled between said power supply and said load, said single active bridge converter comprising:
a transformer comprising a primary winding and a secondary winding;
a primary side circuit electrically coupled to said primary winding and comprising an H bridge circuit; and
a secondary side circuit electrically coupled to said secondary winding, said secondary side circuit including:
a switch coupled to said secondary winding, said switch configured to selectively short said secondary winding, said switch comprising:
first and second serially-coupled diodes, wherein a first side of said secondary winding is coupled to a first node defined between said first and second serially-coupled diodes;
third and fourth serially-coupled diodes, wherein a second side of said secondary winding is coupled to a second node defined between said third and fourth serially-coupled diodes; and
a switching device electrically coupled between a third node defined between said first and third diodes and a fourth node defined between said second and fourth diodes, wherein when closed, said switching device is configured to cause voltage applied across said secondary winding to be zero; and a passive circuit coupled to an output of said secondary winding, said passive circuit comprising:
a fifth diode electrically coupled in series to a first capacitor, said series-coupled fifth diode and first capacitor directly connected at a first side to an output of said switch defined at said third node and at a second side to said second side of said secondary winding; and
a sixth diode electrically coupled in series to a second capacitor, said series-coupled sixth diode and second capacitor directly connected at a first side to an output of said switch defined at said fourth node and at a second side to said second side of said secondary winding.

6. A power conversion system in accordance with claim 5, further comprising a controller communicatively coupled to said switch, said controller operable to control said switch to selectively short said transformer secondary winding.

7. A power conversion system in accordance with claim 5, wherein said secondary winding comprises a first end and a second end, and wherein said switch is electrically coupled between said first and second ends.

8. A power conversion system in accordance with claim 5, wherein said switching device is an IGBT.

9. A power conversion system in accordance with claim 5, wherein said power supply is a direct current (DC) power supply, and wherein said single active bridge converter comprises a direct current (DC) to DC converter.

10. A method for operating a power conversion system, said method comprising:
electrically coupling a single active bridge converter between a power supply and a load, the single active bridge converter including a transformer having a primary winding and a secondary winding electrically coupling a primary side circuit to the primary winding, the primary side circuit including an H bridge circuit;
electrically coupling a secondary side circuit to the secondary winding, wherein electrically coupling the secondary side circuit comprises:
coupling a switch to the secondary winding, the switch configured to selectively short the secondary winding, wherein coupling the switch comprises:
coupling a first side of the secondary winding to a first node defined between first and second serially-coupled diodes;
coupling a second side of the secondary winding to a second node defined between third and fourth serially-coupled diodes; and
electrically coupling a switching device between a third node defined between the first and third diodes and a fourth node defined between the second and fourth diodes, wherein when closed, the switching device is configured to cause voltage applied across the secondary winding to be zero;
coupling a passive circuit to an output of the secondary winding, wherein coupling the passive circuit comprises:
electrically coupling a fifth diode in series to a first capacitor, the series-coupled fifth diode and first capacitor directly connected at a first side to an output of the switch defined at the third node and at a second side to the second side of the secondary winding;

electrically coupling a sixth diode in series to a second capacitor, said series-coupled sixth diode and second capacitor directly connected at a first side to an output of said switch defined at the fourth node and at a second side to the second side of the secondary winding; and operating the switching device to selectively short the transformer secondary winding.

\* \* \* \* \*